(12) United States Patent
Criscione

(10) Patent No.: US 11,991,204 B2
(45) Date of Patent: *May 21, 2024

(54) AUTOMATIC VULNERABILITY MITIGATION IN CLOUD ENVIRONMENTS

(71) Applicant: Google LLC, Mountain View, CA (US)

(72) Inventor: Claudio Criscione, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,105

(22) Filed: Jan. 23, 2023

(65) Prior Publication Data

US 2023/0164170 A1  May 25, 2023

Related U.S. Application Data

(63) Continuation of application No. 17/236,703, filed on Apr. 21, 2021, now Pat. No. 11,570,200.

(51) Int. Cl.
*H04L 9/40* (2022.01)

(52) U.S. Cl.
CPC ...... *H04L 63/1433* (2013.01); *H04L 63/1441* (2013.01); *H04L 63/20* (2013.01)

(58) Field of Classification Search
CPC .. H04L 63/1433; H04L 63/1441; H04L 63/20
USPC .......................................................... 726/1
See application file for complete search history.

(56) References Cited

U.S. PATENT DOCUMENTS

| | | | |
|---|---|---|---|
| 10,050,999 B1* | 8/2018 | Rossman | H04L 63/1416 |
| 10,089,482 B2* | 10/2018 | Skipper | G06F 21/604 |
| 2007/0143851 A1* | 6/2007 | Nicodemus | H04L 63/1433 726/4 |
| 2008/0276319 A1* | 11/2008 | Rittermann | H04L 63/1425 726/23 |
| 2013/0031600 A1* | 1/2013 | Luna | G06F 12/1408 726/1 |
| 2014/0215621 A1* | 7/2014 | Xaypanya | H04L 63/145 726/23 |
| 2014/0245374 A1* | 8/2014 | Deerman | H04L 63/20 726/1 |
| 2015/0135262 A1* | 5/2015 | Porat | G06F 21/552 726/1 |
| 2017/0063930 A1* | 3/2017 | Chesla | H04L 63/1425 |

* cited by examiner

*Primary Examiner* — Teshome Hailu
(74) *Attorney, Agent, or Firm* — Honigman LLP; Brett A. Krueger

(57) ABSTRACT

A method for implementing a migration action for a vulnerability includes receiving an indication that a target resource includes a vulnerability where the target resource is being hosted in a cloud environment and associated with a user of the cloud environment. The method also includes receiving a plurality of rules configured to mitigate vulnerabilities for cloud environment resources. The method further includes determining whether the plurality of rules include one or more rules corresponding to the vulnerability of the target resource. When the plurality of rules comprises the one or more rules corresponding to the vulnerability of the target resource, the method includes applying a reversible mitigation action associated with a respective rule of the one or more rules corresponding to the vulnerability of the target resource.

16 Claims, 5 Drawing Sheets

AUTOMATIC VULNERABILITY MITIGATION IN CLOUD ENVIRONMENTS

CROSS REFERENCE TO RELATED APPLICATIONS

This U.S. patent application is a continuation of, and claims priority under 35 U.S.C. § 120 from, U.S. patent application Ser. No. 17/236,703, filed on Apr. 21, 2021. The disclosure of this prior application is considered part of the disclosure of this application and is hereby incorporated by reference in its entirety.

TECHNICAL FIELD

This disclosure relates to automatic vulnerability mitigation in cloud environments.

BACKGROUND

Today, computing systems and the Internet have become a part of everyday life, but, unfortunately, these systems are not without weaknesses. For instance, Internet-exposed systems have vulnerabilities they can be exploited by cyber-attacks. To make matters worse, cyber-attacks may occur in a very short time frame. With a short time frame, humans may be inherently unable to react effectively. Moreover, the computing systems that are being used by people are shifting from solely local computing resources (e.g., a personal computer) to remote computing systems (e.g., user data stored in a distributed system). In other words, people today are relying more heavily on cloud environments and the services that these cloud environments provide. Since generally cloud environments are directly exposed to the Internet, these cloud environments may be prime targets for cyber-attacks. Accordingly, these cloud environments need systems and methods to proactively mitigate their vulnerabilities.

SUMMARY

One aspect of the disclosure provides a computer-implemented method for implementing a migration action for a vulnerability. The method, when executed by data processing hardware causes the data processing hardware to perform operations. The operations include receiving an indication that a target resource includes a vulnerability where the target resource is being hosted in a cloud environment and associated with a user of the cloud environment. The operations also include receiving a plurality of rules configured to mitigate vulnerabilities for cloud environment resources. The operations further include determining whether the plurality of rules include one or more rules corresponding to the vulnerability of the target resource. When the plurality of rules includes the one or more rules corresponding to the vulnerability of the target resource, the operations include applying a reversible mitigation action associated with a respective rule of the one or more rules corresponding to the vulnerability of the target resource.

Another aspect of the disclosure provides a system for implementing a migration action for a vulnerability. The system includes data processing hardware and memory hardware in communication with the data processing hardware. The memory hardware stores instructions that when executed on the data processing hardware cause the data processing hardware to perform operations. The operations include receiving an indication that a target resource includes a vulnerability where the target resource is being hosted in a cloud environment and associated with a user of the cloud environment. The operations also include receiving a plurality of rules configured to mitigate vulnerabilities for cloud environment resources. The operations further include determining whether the plurality of rules include one or more rules corresponding to the vulnerability of the target resource. When the plurality of rules includes the one or more rules corresponding to the vulnerability of the target resource, the operations include applying a reversible mitigation action associated with a respective rule of the one or more rules corresponding to the vulnerability of the target resource.

Implementations of the computer-implemented method or the system of the disclosure may include one or more of the following optional features. In some implementations, in response to applying the reversible mitigation action, monitoring activity for the target resource, the operations also include monitoring activity for the target resource. While monitoring activity for the target resource, the operations also include determining whether the vulnerability of the target resource exists and, when the vulnerability of the target resource fails to exist, the operations further include reversing the reversible mitigation action. In some examples, after applying the reversible mitigation action, the operations also include receiving a remedial indication regarding the vulnerability of the target resource and, in response to receiving the remedial indication regarding the vulnerability of the target resource, the operations additionally include reversing the reversible mitigation action. In some configurations, applying the reversible mitigation action associated with the respective rule of the one or more rules also includes determining that the user associated with the target resource permits the reversible mitigation action associated with the respective rule to be applied to address the vulnerability of the target resource. In these implementations, the vulnerability may have been exploited by a source of the indication. The plurality of rules may be configured by the user of the cloud environment.

Configurations of the computer-implemented method or the system of the disclosure may include one or more of the following additional features. In these configurations, when the plurality of rules includes the one or more rules corresponding to the vulnerability of the target resource, the operations also include scoring each rule of the one or more rules corresponding to the vulnerability of the target resource based on a scoring criteria where the scoring criteria represents an impact of a respective action associated with a respective rule and determining that the respective rule includes a respective score that satisfies a scoring threshold. In these configurations, the respective score for the respective rule may correspond to a greatest score among each score of the one or more rules. The impact of the impact of the respective action may include a risk associated with the vulnerability for the target resource and a value of the target resource. Here, the user may designate the value of the target resource.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
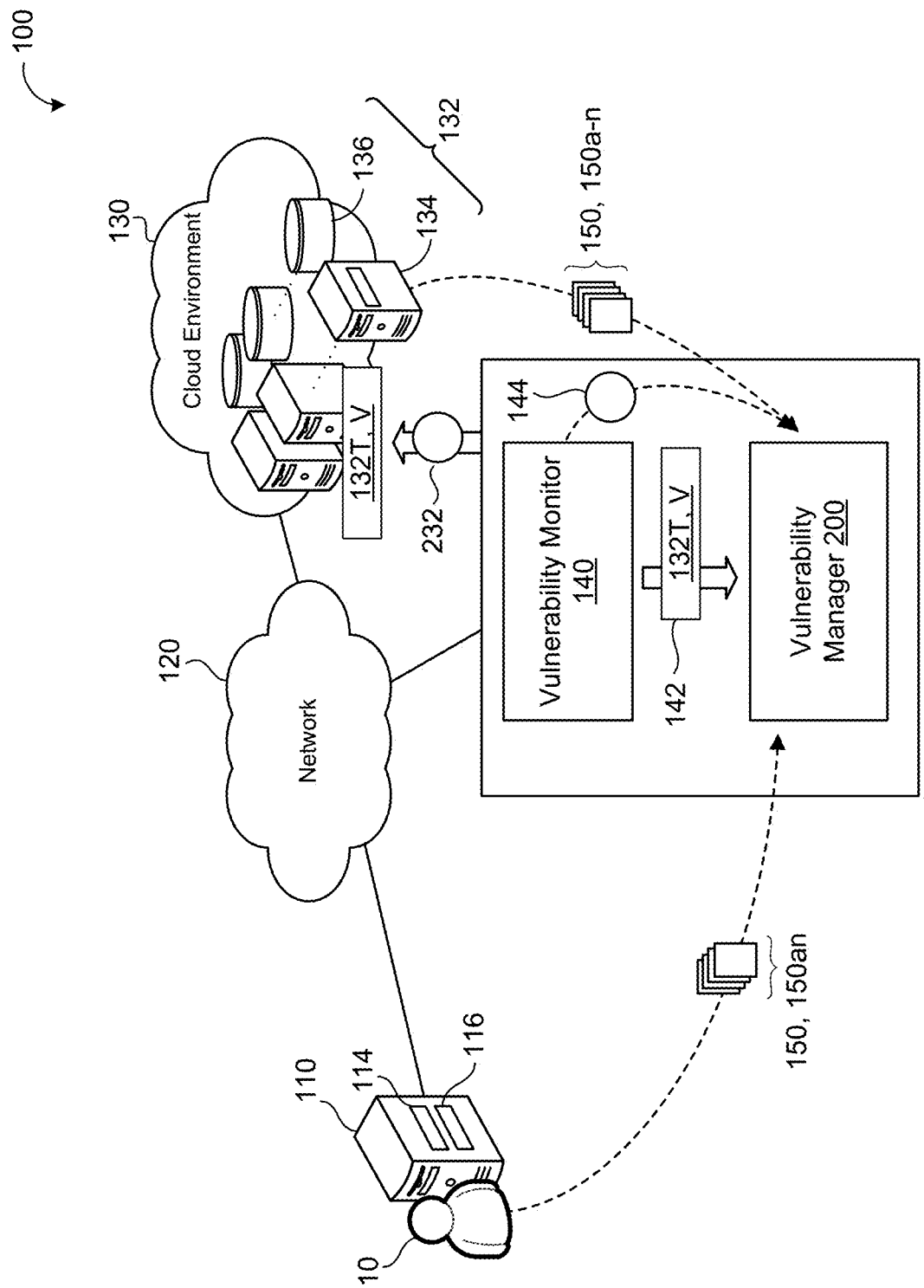
FIG. 1 is a schematic view of an example vulnerability system for a cloud environment.

In cyber security, a vulnerability is a weakness which can be exploited by a cyber attack to gain unauthorized access to or to perform unauthorized actions on a computing system. A vulnerability, if exploited, can allow attackers to run code, to access a system's memory, to install malware, and/or to steal, destroy, or otherwise modify sensitive or personal data. A vulnerability is different from an actual cyber attack because a vulnerability is an exploitable weakness that is present. Broadly speaking, this means that a vulnerability, unlike a cyber attack, is not actively concealed. Cyber attackers identify vulnerabilities in systems based on the reality that vulnerabilities, in some respect, are identifiable to external entities.

Yet often, instead of operating like a cyber attacker to identify vulnerabilities, cyber security takes the approach of trying to identify cyber attacks. One difficulty with this approach is that cyber attacks purposely try to conceal themselves or blend with the system to avoid detection. This makes detection more difficult because cyber security is looking for subtle changes or nuances of code that should not be present in a computing system. Moreover, identifying these subtle differences to detect some type of cyber attack inherently lends itself to be resource consuming and tedious work in order to be effective.

Additionally, by configuring cyber security to identify cyber attacks, the cyber security is basically operating in a reactive role. When the security industry operates reactively by trying to identify an actual cyber attack, the cyber attackers are likely to already have some degree of success in their attack. For example, cyber attackers can exploit vulnerabilities of exposed systems within a very short time frame. By operating reactively, that very short time frame may have already occurred before cyber security implements efforts to mitigate the cyber attack. This is especially true when humans instead of automation are behind cyber attack mitigation efforts. In other words, cyber attacks occur way too quickly for humans to react effectively. For instance, certain classes of the vulnerabilities on systems hosted in cloud environments (e.g., related to authentication issues) may be exploited by cyber attacks within hours or even minutes.

Cloud computing environments are particularly problematic for security vulnerabilities for several reasons. One reason is that generally cloud environments are directly exposed to the Internet. Besides this direct exposure to a potential threat source (e.g., a cyber attacker), another reason is that cloud environments tend to exist within a predictable address space. The predictable address space is typically beneficial for the cloud environment to function as a scalable distributed computing platform, but problematic from a vulnerability standpoint. Additionally, cloud environments are set up to leverage shared resources among clients. This makes remediating or fixing vulnerabilities more complicated than a single computing machine because upgrades or configuration changes may break dependencies of resources (e.g., in an irreversible manner) and/or impact the functionality of services being used by one or more clients. To compound things, cloud service providers generally lack insight as to what is running on workloads for their clients. Therefore, although a service provider wants to help protect a client from being compromised by a vulnerability or to contribute to a remediating effort, the manner in which cloud environments are structured hinders the ability of the cloud service provider to effectively do so for its clients.

Although there are a few approaches for vulnerability management, these approaches are not without their setbacks. For example, some systems rely on notifications where a system informs the system administrators that it has identified a vulnerability. Yet this approach is too slow to be effective for a large computing environment like a cloud computing environment give the speed that cyber attackers exploit vulnerabilities. Another approach is referred to as an "auto-patching" approach. Although auto-patching approaches are popular for vulnerability management (e.g., auto-upgrading machines at some frequency—daily, weekly, etc.), this auto-patching approach is also relatively slow and is only able to address a small portion of all vulnerabilities such that it fails to address missing configurations and application-layer issues.

One approach that is capable of providing speedy mitigation is the technique of virtual patching. Unfortunately, virtual patching is used in the web application firewall domain and is specific to web applications. Virtual patching is generally not extensible to cloud services other than web applications because it lacks compatibility with prevalent components of cloud environments, such as virtual machines or other protocols/hosted services. Furthermore, virtual patching specifically targets a subset of exploitation venues applicable to already-identifiable vulnerabilities. Therefore, virtual patching does not have the flexibility nor the compatibility with systems present in a cloud environment.

Some vulnerability management uses what are known as intrusion prevention systems (IPS). There are two fundamental types of IPS. The first type is signature-based intrusion prevention and the second type is an anomaly (or behavior) based intrusion prevention. In signature-based IPS, the system monitors inbound network traffic to find patterns or sequences that match a particular attack signature. When the system finds the particular attack signature, the system blocks traffic that includes that particular attack signature. A behavior based IPS functions similarly to the signature-based IPS, but a behavior-based IPS will block any traffic that matches a certain set of known bad behaviors or, conversely, does not match a set of known good behaviors. Yet unfortunately, either type of IPS functions to identify an attack rather than a vulnerability. Furthermore, there are entire classes of vulnerabilities that are nearly impossible to identify without observing the response of the cloud environment (e.g., a server of the cloud environment). Also with IPS, it is more common to have false positives to err on the side of caution that a cyber attack is present. However, since a vulnerability does not disguise itself like a cyber attack, vulnerability mitigation techniques should instead strive to be relatively free of false positives.

More importantly, cloud environments do not operate in a manner that is friendly toward in-line IPS of the type that can block attacks. That is, much of the network traffic in a cloud environment does not actually reach hosted infrastructure. For example, an attack may attempt to compromise a vulnerable authentication (or permission) scheme without ever accessing the cloud-based storage that is actually hosted by the cloud service provider. Yet even when the network traffic flows through a network under control of the client, client traffic is more often today encrypted end-to-end with only the receiving service able to inspect it. With end-to-end encryption, IPS would be unable to identify an attack signature underneath the encryption. In contrast to this and other existing approaches, the technique described herein seeks to proactively discover and to mitigate vulnerabilities at a speed that prevents (e.g., completely avoids) or reduces exploitation of these vulnerabilities.

FIG. 1 is an example of a vulnerability system 100. The vulnerability system 100 includes one or more clients 10 (also referred to as users 10) who communicate via a network 120 with a cloud environment 130. The clients 10 communicate with the cloud environment 130 to access and/or to execute various computing platforms, computing services, computing resources, or other types of computing functionality offered by a cloud service provider. The client 10 may generally refer to any user of the cloud environment 130. In this respect, the client 10 may range from being a business or enterprise to an individual user of the cloud environment 130. The client 10 communicates with the remote system 130 using a client device 110 that may correspond to any computing device associated with the client 10. Some examples of client devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The remote system 130 may include remote resources 132 (also referred to as cloud resources 132), such as remote data processing hardware 134 (e.g., remote servers or CPUs) and/or remote memory hardware 136 (e.g., remote databases or other storage hardware). Furthermore, these remote resources 132 may refer to virtualized computing resources such as virtual machines or web-based applications. The client device 110 may utilize the remote resources 132 to perform various functionality related to processes or services of the cloud environment 130. These processes may be hosted by the cloud environment 130 or integrate with local resources of the client device 110 (e.g., shown as local data processing hardware 112 or local memory hardware 114).

The client 10 (e.g., via the client device 110) may interact with a vulnerability monitor 140 and/or a vulnerability manager 200 to ensure that vulnerabilities or weaknesses related to cloud infrastructure utilized by the client 10 or client data of the client 10 is not exploited by some threat source. By using the vulnerability monitor 140 and/or vulnerability manager 200, the client 10 is able to configure rules 150 or to leverage existing rules 150 to allow the vulnerability manager 200 to implement a mitigation action 232 for a vulnerable resource 132 in the cloud environment 130. Here, the vulnerable resource 132 is referred to as a target resource 132, 132T with a vulnerability V. When the vulnerability manager 200 implements a particular mitigation action 232 for the vulnerable resource 132, the vulnerability manager 200 allows some entity (e.g., a cloud service provider or security entity) to have the necessary time to remediate the vulnerability V of the vulnerable resource 132 (i.e., the target resource 132T). Since the client 10 only needs to provide or setup a desired set of rules 150, the client 10 does not need to perform any additional input into the vulnerability manager 200; allowing the vulnerability manager 200 to perform automatic mitigation.

The behavior or functions of the vulnerability manager 200 can be configured not only for a specific instance of a vulnerability, but more generally for entire classes of vulnerabilities. In other words, the vulnerability V may refer to a specific vulnerability V that affects a particular target resource 132T or a class of vulnerabilities V that affects the target resource 132T. For example, a specific vulnerability V may refer to a vulnerability V identified by a common vulnerability and exposure database identifier (CVE ID), while a class of vulnerability V may refer to the vulnerability of remote code execution.

The vulnerability monitor 140 of the vulnerability system 100 is configured to evaluate a security state of the cloud environment 130. For example, the vulnerability monitor 140 monitors the security state of the cloud environment 130 continuously or at some designated frequency. Here, the security state refers to an analysis as to whether the cloud environment 130 include some asset or resource 132 with a particular weakness of vulnerability V. The vulnerability monitor 140 may include any type of security testing (e.g., automated security testing) performed on the cloud environment 130 and workloads operating in the cloud environment 130, such as configuration auditing, application-level scanning, password analysis, etc. Moreover, the vulnerability monitor 140 may employ more than one type of security testing (e.g., all types or any combination thereof).

Figure 2A:
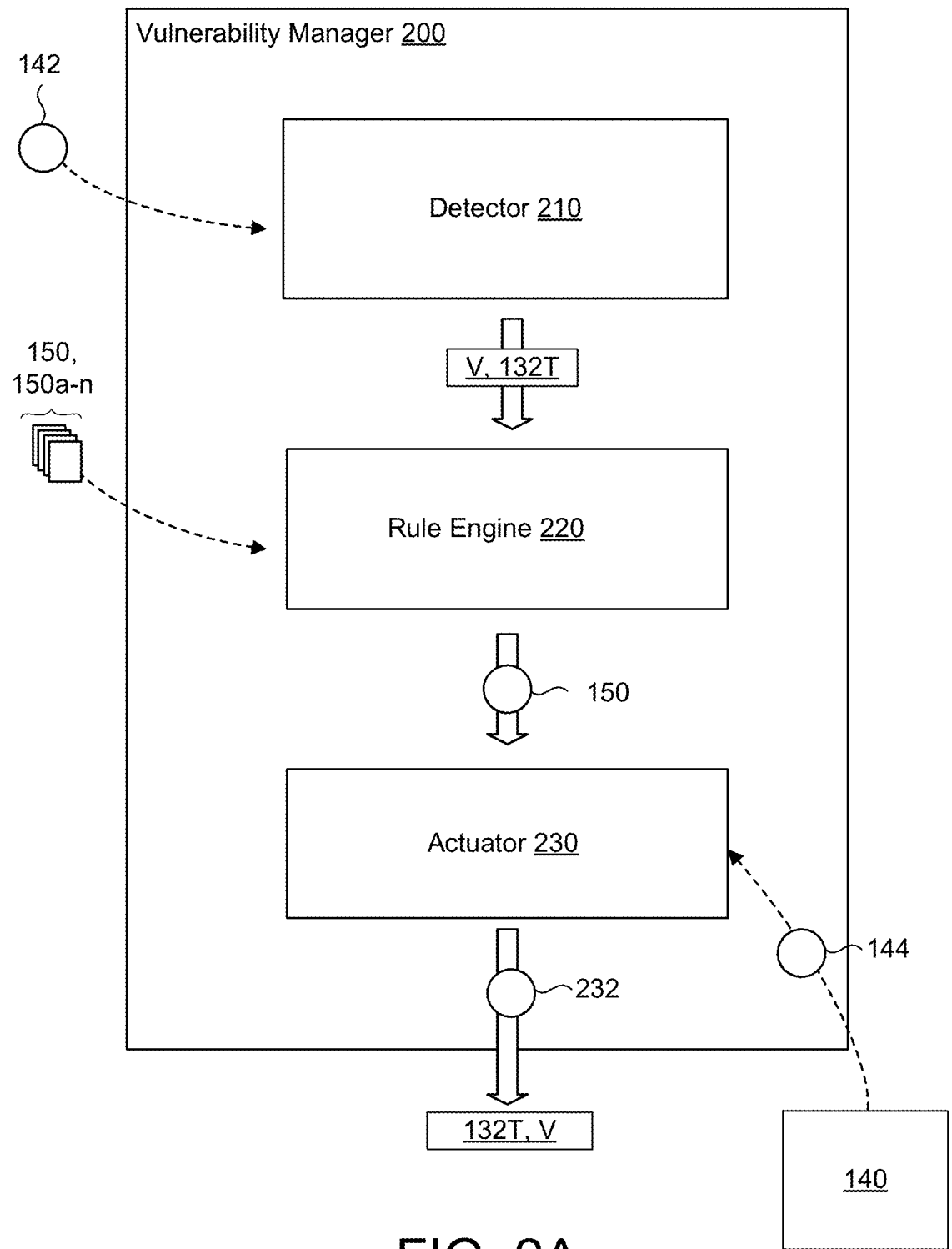
FIGS. 2A and 2B are schematic views of example vulnerability managers for the vulnerability system of FIG. 1.
Figure 2B:
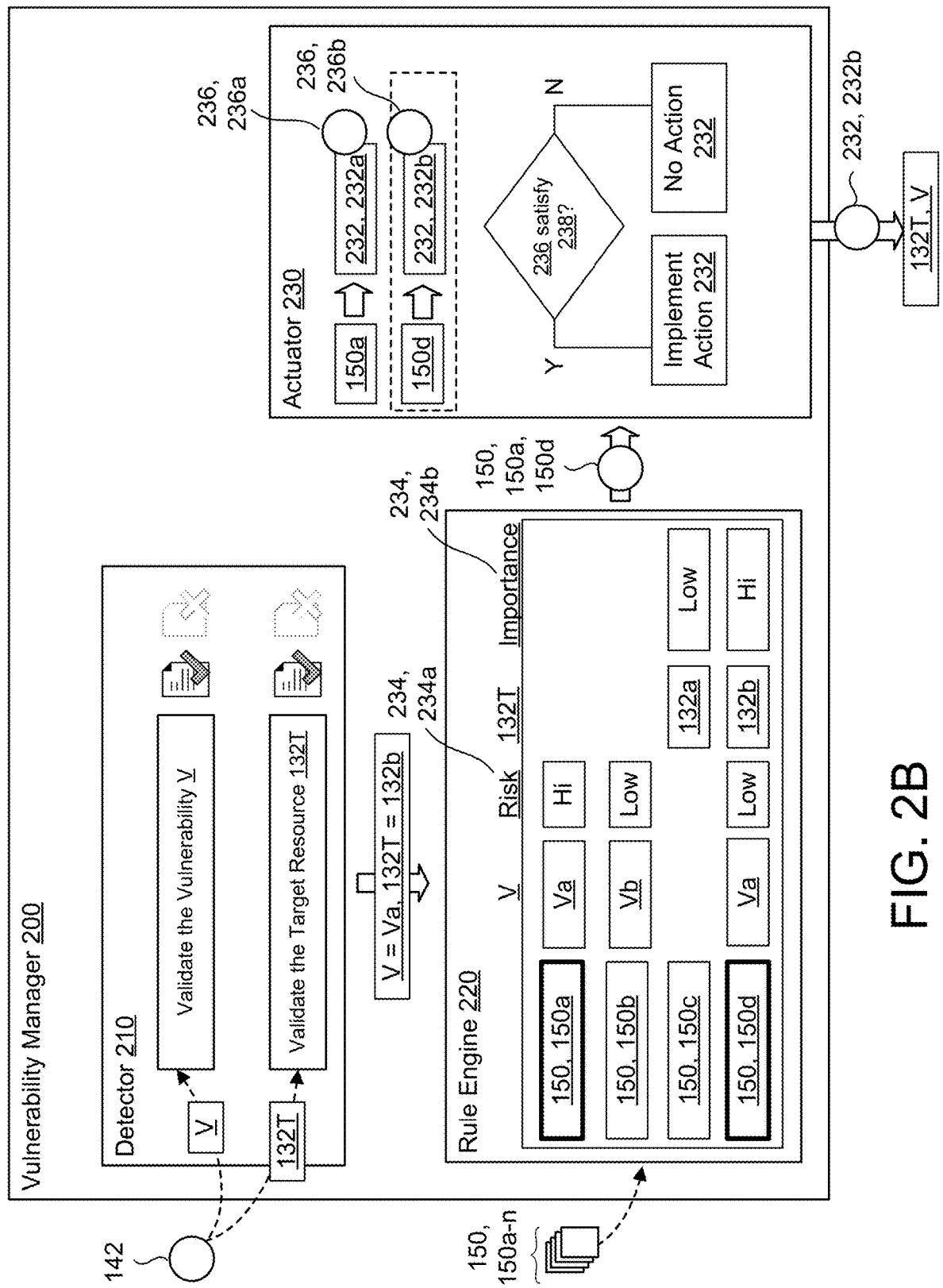

Referring to FIGS. 2A and 2B, the vulnerability manager 200 includes a detector 210, a rule engine 220, and an actuator 230. The detector 210 is configured to receive an indication 142 that a target resource 132, 132T includes a vulnerability V from the vulnerability monitor 140. Although, in some implementations, the detector 210 of the vulnerability manager 200 is not responsible for the original detection of a vulnerability V for the target resource 132T of the cloud environment 130, the detector 210 may be configured to validate or otherwise confirm that the target resource 132T has the indicated vulnerability V. That is, when the vulnerability manager 200 is an automated mitigation process, it may be in the manager's interest to validate vulnerabilities V to avoid automatically mitigating a vulnerability V that does not actually exist and impacting the cloud environment 100 in this fashion. Without a low or even negligible false positive rate for vulnerability detection, an automatically mitigating system risks potentially detrimental harm to the cloud environment 130. In some configurations, the detector 210 validates the vulnerability V by confirming that the vulnerability V of the target resource 132T is exploitable. For instance, the detector 210 tests whether the vulnerability V of the target resource 132T is exploitable by actually attempting to exploit the vulnerability V of the target resource 132T. Here, if the attempt to exploit the vulnerability V of the target resource 132T is successful in exploiting the vulnerability V, the detector 210 validates or confirms the existence of the vulnerability V. In some examples, once the detector 210 validates the vulnerability V, the detector 210 passes the vulnerability V of the target resource 132T to the rule engine 220. For instance, FIG. 2B illustrates a filled-in check mark next to the vulnerability validation operation of the detector 210 to indicate that the vulnerability V identified by the indicator 142 from the vulnerability monitor 140 has been validated as a respective vulnerability V.

The process of validating the vulnerability V by the detector 210 may also function to ensure that the target resource 132T is unambiguously the resource 132 with the vulnerability V. That is, some vulnerability monitors 140 may have difficulty identifying the target resource 132T associated with the vulnerability V with particularity. For example, cloud environments 100 often include layered applications that are rather complex since these layered applications are composed of multiple servers. Accordingly, a vulnerability monitor 140 may know a vulnerability V exists, but yet have difficulty attributing the vulnerability V to a specific computing resource (i.e., unambiguously identifying the target resource 132T of the vulnerability V). With this being the case, the detector 210 may identify or otherwise confirm the target resource 132T that is the root cause of the vulnerability V. For instance, the detector 210 analyzes a configuration of supporting services associated with the target resource 132T to determine whether the identified target resource 132T from the indication 142 properly corresponds to a cloud environment asset that is the root cause of the vulnerability V. Here, the detector 210 may leverage the introspectiblity of cloud environment resources 132 and configurations to perform root causes analysis for the vulnerability V. Much like when the detector 210 validates that the vulnerability V exists, the detector 210 may pass the vulnerability V of the target resource 132T to the rule engine 220 when the detector 210 confirms that the target resource 132T is the resource 132 that corresponds to the vulnerability V. Additionally or alternatively, the detector 210 may only pass the vulnerability V and the target resource 132T to the rule engine 220 when both of these elements V, 132T have been validated. For instance, FIG. 2B depicts the detector 210 successfully validating both the vulnerability V and the target resource 132T identified by the indicator 142 with a filled-in check mark next to each of the validation operations. Although these validation functions are described with respect to the detector 210, the vulnerability manager 200 may offload one or both of these validation functions to the vulnerability monitor 140.

The rule engine 220 is configured to determine how the vulnerability V for the target resource 132T will be handled. For example, the rule engine 220 receives the target resource 132T along with the vulnerability V for the target resource 132T (e.g., from the detector 210) and determines whether a plurality of rules 150, 150a—n includes one or more rules 150 that correspond to the vulnerability V of the target resource 132T. When the plurality of rules 150 include one or more rules 150 corresponding to the vulnerability V of the target resource 132T, the rule engine 220 communicates the one or more rules 150 corresponding to the vulnerability V of the target resource 132T to the actuator 230. FIG. 2B illustrates an example where the vulnerability V corresponds to a first vulnerability V, Va and the target resource 132T corresponds to a first resource 132, 132a of the cloud environment 130. In this example, the rule engine 220 includes four rules 150, 150a—d where a first rule 150a refers to criteria regarding the first vulnerability Va and a fourth rule 150d refers to a criteria that relates to both the first vulnerability Va and the first resource 132a of the cloud environment 130. The rule engine 220 therefore passes the first rule 150a and the fourth rule 150d to the actuator 230 in order to perform further vulnerability manager 200 operations. Here, in this example, neither a second rule 150b nor a third rule 150c pertain to the vulnerability Va or the target resource 132a.

The rules 150 may refer to a set of desired outcomes for when particular vulnerabilities V are present in a resource 132 of the cloud environment 130. Some examples of rules 150 includes rules 150 that define access restrictions (e.g., limit access to the target resource 132T to a specific country, authenticated user(s), etc.), rules 150 that generate notifications or alerts (e.g., sent to a security operations center (SOC), an administrator of the cloud environment 130 or client data, or other types of owners with oversight controls regarding the target resource 132T), rules 150 that trigger some level of monitoring (e.g., increased monitoring) of the target resource 132T, rules 150 that initiate logs (e.g., logs of resource behavior or network traffic), rules 150 that generate a forensic-relevant snapshot (e.g., at some frequency or instance in time), or rules 150 that compound two or more rules 150 together. The rule engine 220 may receive the rules 150 from a client 10 (also referred to as a user 10) of the cloud environment 130 or from an entity providing the autoremediation infrastructure for the cloud environment 130 (e.g., the cloud service provider or a security provider associated with the cloud environment 130). In some examples, the rule engine 220 receives a set of rules 150 from multiple entities (e.g., both the client 10 and the cloud service provider).

In some configurations, the vulnerability manager 200 includes a set of default rules 150 (e.g., rules 150 established or setup by the administrative entity associated with cloud environment 130) and the client 10 is able to modify or to select rules 150 from the set of default rules 150 for the actuator 230 to apply to an identified vulnerability V. In this manner, a client 10 may define its own mitigation functions using one or more rules 150 when particular criteria are met. The criteria may be configured based on the specific vulnerability V, the specific target resource 132T, or both. For example, FIG. 2B illustrates the first rule 150a based on a first vulnerability Va, the second rule 150b also based on a vulnerability V, but on a second vulnerability Vb, the third rule 150c based on the target resource 132T being the first resource 132a without any specific vulnerability V, and the fourth rule 150d having criteria for both a vulnerability V of the first vulnerability Va and a target resource 132T corresponding to a second resource 132b of the cloud environment 130. For the sake of explanation, if the vulnerability V relates to client data access, the client 10 may configure or communicate a rule 150 (e.g., the first rule 150a) that the access point or pathway be disconnected when this vulnerability V is present. On the other hand, if the target resource 132T that is vulnerable to unauthorized access is a not a sensitive or critical resource 132T, then the client 10 may configure or communicate a rule 150 (e.g., the third rule 150c) that the target resource 132T is relocated to a location that is more secure than its current location or that the target resource 132T receives increased monitoring. The criteria and/or rule 150 may be implemented as code or as any type of automation dialect supported by the cloud service provider of the cloud environment 130. In some configurations, the client 10 establishes the rules 150 using a client-facing interface associated with the vulnerability manager 200.

The customization of the rule engine 220 allows the vulnerability manager 200 to understand the desired outcomes of the client 10. In this respect, the vulnerability manager 200 is client-oriented and may attempt to prioritize the client 10 over potentially the desires of the cloud environment provider. For instance, when the client 10 is a business, this business will likely take the risk of generating a controlled outage rather than having a breach. Yet that same business often will not accept that its services are pulled from access to the Internet without an understanding of the consequences. The rule engine 220 therefore allows the client 10 to have greater control regarding vulnerabilities V by specifying constraints in the form of rules 150. For instance, the client 10 may have rules 150 that constrain the maximum number of systems taken offline for a vulnerability V (e.g., within a particular region or zone) or designate one or more users that should never be blocked from accessing the target resource 132T. A rule 150 may also be specific in that the rule 150 may designate the relative importance of the target resource 132T to the client 10 such that the actuator 230 may then implement a rule 150 by performing risk analysis that accounts for the importance of the target resource 132T. Furthermore, the rule 150 may designate the risk or a risk level associated with the specific vulnerability V for the rule 150. Here, the risk may be represented as some designated value on a scale that indicates a range of risk from no risk (or "low" risk) to significant risk (e.g., "high" risk). As shown in FIG. 2B, there may be rules 150, such as the fourth rule 150d, that designate both the risk for the specific vulnerability V corresponding to the rule 150 and the importance of the target resource 132T identified by the rule 150.

The actuator 230 is configured to take directives generated by the rule engine 220 and to translate one or more of the rules 150 into mitigation actions 232. A mitigation action 232 refers to an action implemented by the actuator 230 that takes some affirmative step to address or eliminate the vulnerability V, often without resolving the underlying cause of the vulnerability V. In some examples, when the plurality of rules 150 include one or more rules that correspond to the vulnerability V of the target resource 132T (or are deemed applicable by the rule engine 220), the actuator 230 apples a mitigation action 232 associated with a respective rule 150 (e.g., one of the applicable rules 150 from the rule engine 220) of the one or more rules 150 corresponding to the vulnerability V of the target resource 132T (e.g., applies a rule 150 deemed applicable by the rule engine 220). Here, the mitigation action 232 may be fully reversible. By being reversible, the action 232 tries to limit or prevent exploitation of the vulnerability V such that the vulnerability V may be remediated or fixed. Additionally, by being reversible, the mitigation action 232 is a temporary step. Therefore, the mitigation action 232 itself does not remediate the vulnerability V, but rather functions to identify a vulnerability V and to give remediation efforts (e.g., a remediation entity) time to eliminate or to reduce the exploitable risk of the vulnerability V. For instance, the mitigation action 232 may take the target resource 132T offline so that it is not accessible to external entities (e.g., exposed to the Internet) or to restrict all access to the target resource 132T. In either example, the mitigation action 232 is temporary and reversible in that the target resource 132T may be placed back online or reverted to its accessibility prior to the mitigation action 232. With a cloud environment 130, it may be especially important to implement a reversible mitigation action 232 because irreversible modifications or changes to resources 132 of a cloud environment 130 can causes detrimental downstream or upstream issues (e.g., break dependencies or other integrated functionality) due to the use of shared resources 132 within the cloud environment 130. That is, a virtual machine taken offline, but then restored back online is a temporary outage. Whereas, a virtual machine updated or otherwise modified may negatively impact clients 10 and client data that relies on the virtual machine. Reversibility therefore becomes important because when responding quickly to a vulnerability V, a remediating entity is not always able to apply a remediating action as quickly while considering or evaluating all the impacts of such a remediating action.

In some examples, to reverse the mitigation action 232, the actuator 230 receives feedback regarding the vulnerability V and/or the target resource 132T to which the mitigation action 232 was applied. The feedback may be obtained by the vulnerability manager's own monitoring efforts or by a feedback loop with another component, such as the vulnerability monitor 140. In some examples, the feedback 144 may be an indication that the vulnerability V for the target resource 132T is no longer present (e.g., does not exist) or an indication that a remedial action has taken place. For instance, since the mitigation action 232 does not resolve the underlying root cause of the vulnerability V, a remedial entity takes one or more remedial actions while the mitigation action 232 is in place to address the underlying root cause of the vulnerability V. Here, the vulnerability manager 200 may be made aware of these remedial actions using the feedback 144 from a feedback loop. Referring specifically to FIG. 2A, the actuator 230 receives a feedback indication 144 (e.g., an indication that communicates remediation has occurred) from the vulnerability monitor 140 and, in response to the feedback indication 144, the actuator 230 reverses the mitigation action 232.

Although it is contemplated that the functionality of the rule engine 220 and the actuator 230 may be integrated, it may be advantageous to decouple these components 220, 230 of the vulnerability manager 200. Decoupling refers to the fact that the rule engine 220 defines directives or rules 150, but does not implement these rules 150. Rather, the actuator 230 implements the relevant rules 150 by translating one or more rules 150 into an action 232 or set of actions 232. Decoupling may be advantageous because there are different types of cloud environments 130 (e.g., implemented by different cloud service providers) and, by decoupling such components 220, 230, the vulnerability manager 200 may be universally compatible across all or multiple cloud environment 130 or designed specifically to a particular cloud environment 130. To illustrate, the rules 150 coordinated by the rule engine 220 may be agnostic from the actual cloud environment 130. For example, the rule engine 220 employs a particular coding platform independent of the application environment (i.e., the cloud environment 130) where the vulnerability manager 200 will operate. In this situation, the actuator 230 then bears the burden of generating a mitigation action 232 based on the rule(s) 150 that is compatible with the cloud environment 130 where the vulnerability manager 200 is deployed. The actuator 230 therefore may be designed universally such that the actuator 230 generates actions 232 across several or all known cloud environments 130 to a universal actuator 230 or generate actions 232 particular to a single cloud environment 130 to be a cloud environment specific actuator 230.

In some configurations, once the actuator 230 generates a mitigation action 232, the actuator 230 determines whether the client 10 associated with the target resource 132T permits the generated mitigation action 232 to be applied to address the vulnerability V of the target resource 132T. In other words, the vulnerability manager 200 at the actuator 230 checks to make sure that the action 232 derived from one or more rules 150 is acceptable to the client 10. Although this confirmation step could be a manual process, here, the actuator 230 may simply check permission-based criteria stored at the vulnerability manager 200 to allow automatic mitigation. For instance, the vulnerability manager 200 includes a list of permissions for different resources 132 or types of resources 132 for the client 10. The list of permissions may be setup by the client 10 either at the vulnerability manager 200 (e.g., at an interface associated with the vulnerability manager 200) or communicated to the vulnerability manager 200. As an example, the list of permissions may specify that a virtual machine used by the client 10 can be taken offline or disconnected as a mitigation action 232, but perhaps that an application used by the client 10 cannot be taken offline or disconnected as a mitigation action 232. In this respect, based on the permissions, the actuator 230 may generate an alternative mitigation action 232 or otherwise modify a mitigation action 232 when a particular mitigation action 232 is not permitted. In some examples, the actuator 230 accounts for the permissions (i.e., uses the permissions) when generating the mitigation action 232.

Optionally, the actuator 230 (or some other component of the vulnerability manager 200) may be further configured to perform additional operations (e.g., feedback operations) after applying the mitigation action 232 to the vulnerability V of the target resource 132T. In some configurations, in response to applying the mitigation action 232, the actuator 230 monitors activity for the target resource 132T to determine whether the vulnerability V for the target resource 132T persists. In some examples, this monitoring occurs in conjunction with the vulnerability monitor 140. Moreover, while monitoring activity for the target resource 132T after applying the mitigation action 232, the actuator 230, or some component in communication with the actuator 230 (e.g., the vulnerability monitor 140), determines that the vulnerability V of the target resource 132T fails to exist and reverses the mitigation action 232. For instance, a remediating entity may have eliminated the vulnerability V. The actuator 230 may also be configured to perform other feedback operations related to the target resource 132T and/or vulnerability V of the target resource 132T. Some of these feedback operations include reporting monitored activity to the client 10, generating alerts or notifications after applying the mitigation action 232, and/or tracking an impact of the mitigation action 232 (e.g., against core metrics such as number of visitors, requests blocked, etc.).

In some implementations, the actuator 230 receives more than one rule 150 from the rule engine 220 (e.g., more than one rule 150 that is applicable to the combination of the vulnerability V and the target resource 132T) and is configured to generate a mitigation action 232 based on the multiple rules 150 that the actuator 230 receives. Here, the actuator 230 may either determine which rule 150 of the multiple rules 150 to apply as an action 232 or to craft an action 232 that accounts for multiple rules 150. In some examples, the actuator 230 determines which rule 150 of the multiple rules 152 to apply as an action 232 by scoring each rule 150 based on scoring criteria 234. From the scoring criteria 234, the actuator 230 generates a score 236 for each rule 150 and determines that the mitigation action 232 should be generated based on the rule 150 with the most optimal score 236 (e.g., the highest score or the best score). Alternatively, the actuator 230 may determine that the mitigation action 232 should be generated based on a rule 150 with a score 236 that satisfies a scoring threshold 238 where the scoring threshold 238 represents an acceptable score value (e.g., for the mitigation needs of the client 10 or the cloud service provider). In this approach, when there are multiple rules 150 that satisfy the scoring threshold 238, the actuator 230 may either simply select one of the rules 150 as the basis for the mitigation action 232 or the actuator 230 may determine which of the rules 150 that satisfy the scoring threshold 238 are easier to implement. Here, easier to implement may mean that an action 232 based on the rule 150 requires less computing resources to implement, requires less monitoring or more computationally expensive monitoring once implemented, requires less time to implement, etc. The scoring criteria 232 may represent an impact that a respective action 232 based on the rule 150 would have if implemented. Here, the impact may account for the impact to the overall cloud environment 130, the impact to the client 10 (e.g., the client's data) more specifically, or some blend thereof. In some configurations, the criteria 232 includes a risk for the vulnerability V and/or the importance of the target resource 132T. Although FIG. 2B depicts the risk 234, 234a and the importance 234, 234b as a high or low designation, the criteria 234 may be any quantifiable representation (e.g., a scale of 1-5, or 1-10).

With continued reference to FIG. 2B, FIG. 2B depicts that the actuator 230 receives the first rule 150a and the fourth rule 150d from the rule engine 220 because both of these rules 150a, 150d are pertinent rules 150 relating to the vulnerability V and the target resource 132T identified by the indicator 142. For the first rule 150a, the actuator 230 generates a first mitigation action 232, 232a and a first score 236, 236a for the first mitigation action 232a. Similarly, the actuator 230 generates a second mitigation action 232, 232b for the fourth rule 150a and a second score 236, 236b for the second mitigation action 232b. Since the actuator 230 may implement either of these mitigation actions 232a, 232b, the actuator 230 determines which action 232 has a better score 236. Here, the actuator 230 is shown selecting the second mitigation action 232b to be implemented as the mitigation action 232 because the second mitigation action 232b has a superior score 236 when compared to the score 236a of the first mitigation action 232a. As FIG. 2B illustrates, the actuator 230 may have formed this determination by determining that the first score 236a failed to satisfy the score threshold 238 (e.g., exceeded a score value set as an acceptable score to implement) while the second score 236b satisfied this score threshold 238. Accordingly, the actuator 230 implements the second mitigation action 232b on the vulnerability V of the target resource 132T. Additionally, FIG. 2B illustrates that the criteria 234 used by the actuator 230 (e.g., to form the score 236) may be generated or obtained at the rule engine 220. For instance, the client 10 when setting up or communicating a rule 150 inputs the criteria 234 for the actuator 230 to assess when generating the mitigation action 232. Alternatively, the rules 150 may be preconfigured with designated criteria 324. In the example of FIG. 2B, the criteria 234 that the actuator 230 uses to generate the score 236 is a first criteria 234, 234a that refers to a risk for the particular vulnerability V and a second criteria 234, 234b that refers to an importance of the target resource 132T.

The vulnerability manager 200 is an automated migration system in that the operations of the detector 210, the rule engine 220, and the actuator 230 occur without human intervention or requiring additional decision making input. That is, once the rules 150 have been setup for the rule engine 220, the vulnerability manager 200 automatically applies the designated set of rules 150 to a vulnerability V for a particular target resource 132T indiscriminately. An entity may intervene in the process if desired, but it is not necessary in order to implement a rule 150 as a mitigation action 232. Ideally, as an automated process, the vulnerability manager 200 may be precisely tuned to the nature of the vulnerability V. Therefore, in some examples, an organization implementing the vulnerability manager 200 provides a vulnerability-specific code or information so that only exploitation attempts targeting the specific vulnerability are blocked. This functionality more closely resembles that of an IPS in some situations such as web application attacks (e.g., attacks that require a minor adjustment of a specific parameter) or network-based attacks (e.g., attacks with a high confidence fingerprint).

Figure 3:
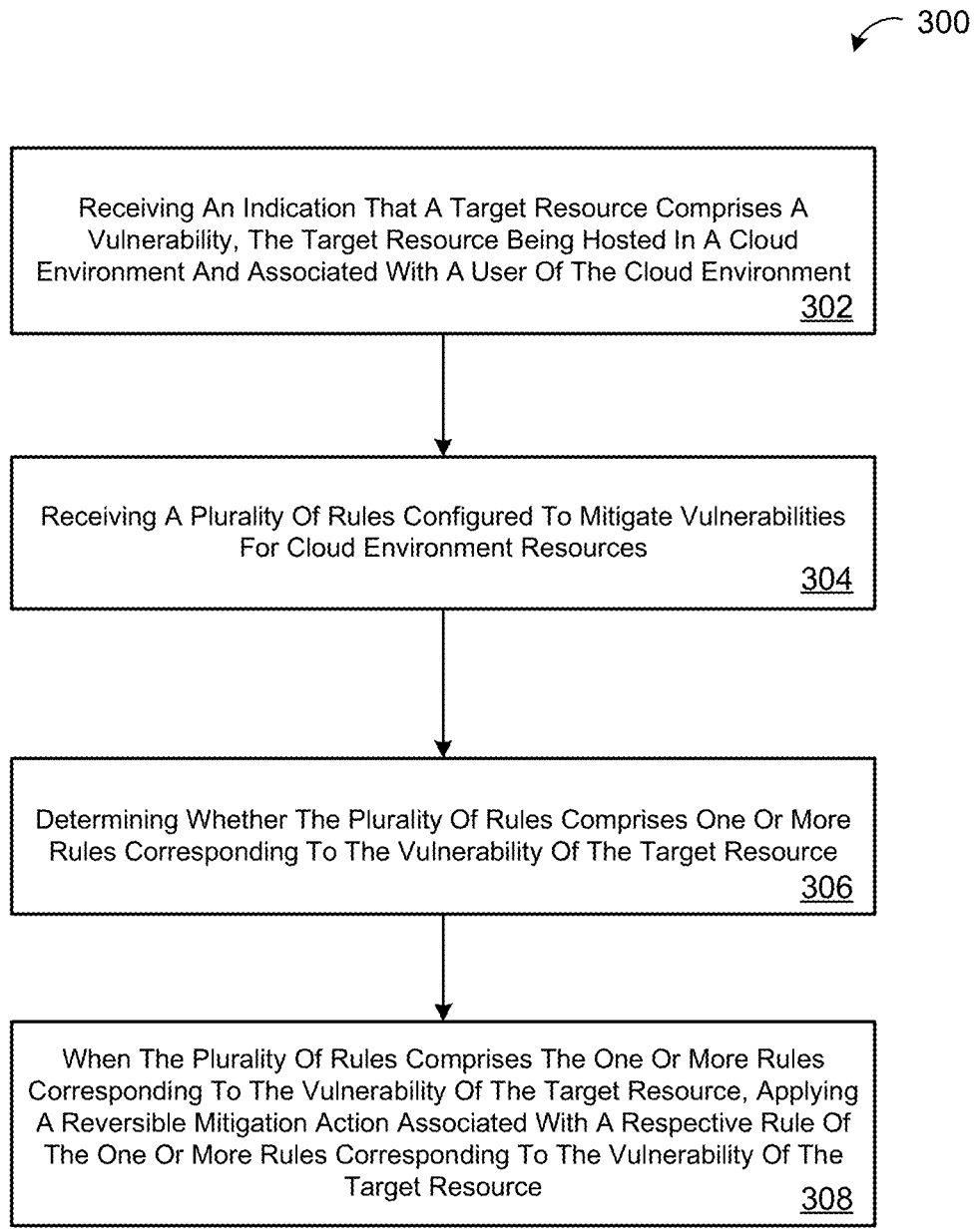
FIG. 3 is a flow chart of an example arrangement of operations for a method of implementing a mitigation rule using the vulnerability manager of the vulnerability system.

FIG. 3 is a flowchart of an example arrangement of operations for a method 300 of implementing a mitigation rule 232 using a vulnerability manager 200. At operation 302, the method 300 receives an indication 142 that a target resource 132t includes a vulnerability V. Here, the target resource 132T is hosted in a cloud environment 130 and associated with a user 110 of the cloud environment 130. Furthermore, the indication 142 identifies the target resource 132T including the vulnerability V. At operation 304, the method 300 receives a plurality of rules 150, 150a—n configured to mitigate vulnerabilities for cloud environment resources 132. At operations 306, the method 300 determines whether the plurality of rules 150, 150a—n includes one or more rules 150 corresponding to the vulnerability V of the target resource 132T. At operation 308, when the plurality of rules 150, 150a—n includes the one or more rules 150 corresponding to the vulnerability V of the target resource 132T, the method 300 applies a reversible mitigation action 232 associated with a respective rule 150 of the one or more rules 150 corresponding to the vulnerability V of the target resource 132T.

Figure 4:
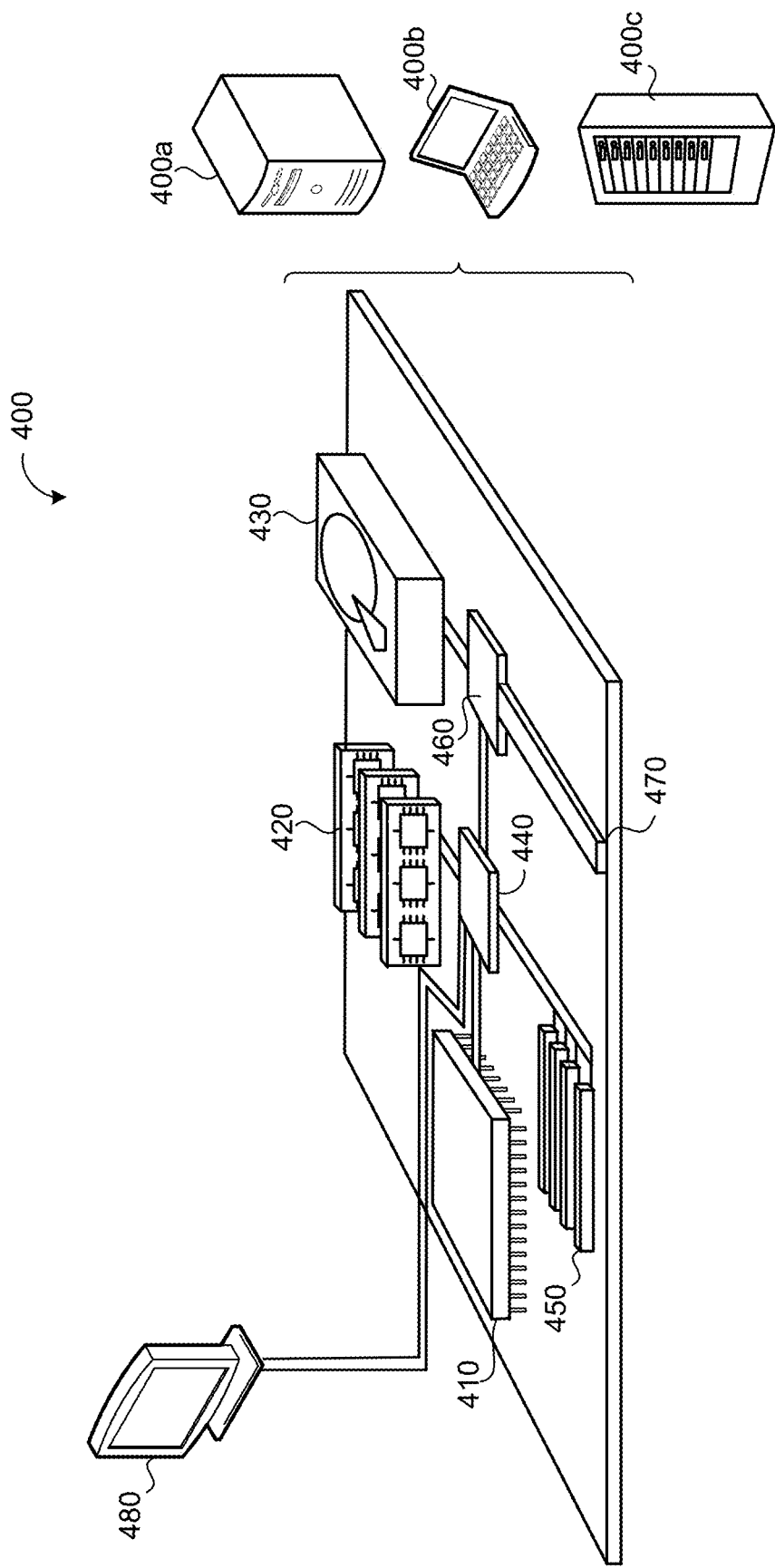
FIG. 4 is a schematic view of an example computing device that may be used to implement the systems and methods described herein.

FIG. 4 is a schematic view of an example computing device 400 that may be used to implement the systems (e.g., the vulnerability system 100, the vulnerability monitor 140, and/or the vulnerability manager 200) and methods (e.g., the method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit any of the various implementations described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
receiving an indication that a target resource comprises a vulnerability, the target resource hosted in a cloud environment and associated with a user of the cloud environment;
determining a first mitigation action to mitigate the vulnerability of the target resource;
transmitting, for display at a client device associated with the user, the first mitigation action;
based on transmitting the first mitigation action, receiving an application indication indicating that the first mitigation action is applied;
in response to receiving the application indication indicating that the first mitigation action is applied, determining that the target resource still comprises the vulnerability;
determining a second mitigation action to mitigate the vulnerability of the target resource, wherein the second mitigation action comprises a reversible mitigation action;
transmitting, for display at the client device associated with the user, the second mitigation action;
based on transmitting the second mitigation action, receiving a second application indication indicating that the second mitigation action is applied;
in response to receiving the second application indication indicating that the second mitigation action is applied, monitoring activity for the target resource;
while monitoring activity for the target resource, determining that the vulnerability of the target resource exists; and
based on determining that the vulnerability of the target resource fails to exist, reversing the second mitigation action.

2. The method of claim 1, wherein the first mitigation action comprises a reversible mitigation action.

3. The method of claim 2, wherein the operations further comprise, in response to determining that the target resource still comprises the vulnerability, reversing the first mitigation action.

4. The method of claim 1, wherein the operations further comprise determining that the user associated with the client device permits the first mitigation action to be applied to address the vulnerability of the target resource.

5. The method of claim 1, wherein the first mitigation action is associated with a first rule and the second mitigation action is associated with a second rule.

6. The method of claim 5, wherein the first rule and the second rule are each configured by the user associated with the client device.

7. The method of claim 1, wherein each of the first mitigation action and the second mitigation action comprises a respective risk associated with the vulnerability for the target resource.

8. The method of claim 1, wherein each of the first mitigation action and the second mitigation action comprises a respective value of the target resource.

9. A system comprising:
data processing hardware; and
memory hardware in communication with the data processing hardware, the memory hardware storing instructions that when executed on the data processing hardware cause the data processing hardware to perform operations comprising:
receiving an indication that a target resource comprises a vulnerability, the target resource hosted in a cloud environment and associated with a user of the cloud environment;
determining a first mitigation action to mitigate the vulnerability of the target resource;
transmitting, for display at a client device associated with the user, the first mitigation action;

based on transmitting the first mitigation action, receiving an application indication indicating that the first mitigation action is applied;
in response to receiving the application indication indicating that the first mitigation action is applied, determining that the target resource still comprises the vulnerability;
determining a second mitigation action to mitigate the vulnerability of the target resource, wherein the second mitigation action comprises a reversible mitigation action; and
transmitting, for display at the client device associated with the user, the second mitigation action;
based on transmitting the second mitigation action, receiving a second application indication indicating that the second mitigation action is applied;
in response to receiving the second application indication indicating that the second mitigation action is applied, monitoring activity for the target resource;
while monitoring activity for the target resource, determining that the vulnerability of the target resource exists; and
based on determining that the vulnerability of the target resource fails to exist, reversing the second mitigation action.

10. The system of claim 9, wherein the first mitigation action comprises a reversible mitigation action.

11. The system of claim 10, wherein the operations further comprise, in response to determining that the target resource still comprises the vulnerability, reversing the first mitigation action.

12. The system of claim 9, wherein the operations further comprise determining that the user associated with the client device permits the first mitigation action to be applied to address the vulnerability of the target resource.

13. The system of claim 9, wherein the first mitigation action is associated with a first rule and the second mitigation action is associated with a second rule.

14. The system of claim 13, wherein the first rule and the second rule are each configured by the user associated with the client device.

15. The system of claim 9, wherein each of the first mitigation action and the second mitigation action comprises a respective risk associated with the vulnerability for the target resource.

16. The system of claim 9, wherein each of the first mitigation action and the second mitigation action comprises a respective value of the target resource.

\* \* \* \* \*